(12) United States Patent
Schneemann et al.

(10) Patent No.: US 12,024,195 B2
(45) Date of Patent: Jul. 2, 2024

(54) METHOD AND SYSTEM FOR PREDICTING BEHAVIOR OF ACTORS IN AN ENVIRONMENT OF AN AUTONOMOUS VEHICLE

(71) Applicant: FORD GLOBAL TECHNOLOGIES, LLC, Dearborn, MI (US)

(72) Inventors: Friederike Schneemann, Bavaria (DE); Andrew T. Hartnett, West Hartford, CT (US); Gregory Boyd Nichols, Franklin Park, PA (US); Constantin Savtchenko, Sewickley, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 151 days.

(21) Appl. No.: 17/336,661

(22) Filed: Jun. 2, 2021

(65) Prior Publication Data
US 2022/0388534 A1    Dec. 8, 2022

(51) Int. Cl.
*B60W 60/00*    (2020.01)
*G05D 1/00*    (2006.01)

(52) U.S. Cl.
CPC ....... *B60W 60/0011* (2020.02); *G05D 1/0088* (2013.01); *G05D 1/0214* (2013.01); *G05D 1/0221* (2013.01); *B60W 2420/403* (2013.01); *B60W 2420/408* (2024.01); *G05D 1/0202* (2013.01); *G05D 1/0206* (2013.01)

(58) Field of Classification Search
CPC ......... B60W 60/0011; B60W 2420/42; B60W 2420/52; B60W 2552/50; B60W 60/0027; B60W 2552/53; G05D 1/0088; G05D 1/0214; G05D 1/0221; G05D 1/0202; G05D 1/0206; G05D 2201/0213
See application file for complete search history.

(56) References Cited

U.S. PATENT DOCUMENTS

| | | | |
|---|---|---|---|
| 9,682,704 B2 | 6/2017 | Teller et al. | |
| 10,414,395 B1 | 9/2019 | Sapp et al. | |
| 10,656,657 B2 | 5/2020 | Djuric et al. | |
| 2020/0023838 A1* | 1/2020 | Zhang | B60W 30/0953 |
| 2020/0156632 A1* | 5/2020 | Ding | B60W 30/0956 |

(Continued)

FOREIGN PATENT DOCUMENTS

DE    102015216352 A1 *  3/2017

OTHER PUBLICATIONS

Brouwer, Machine Translation of DE-102015216352-A1 (Year: 2017).*

(Continued)

*Primary Examiner* — Anne Marie Antonucci
*Assistant Examiner* — Patrick Daniel Mohl
(74) *Attorney, Agent, or Firm* — Frank A. MacKenzie; Brooks Kushman P.C.

(57) ABSTRACT

Methods by which an autonomous vehicle may predict actions of other actors are disclosed. A vehicle will assign either a high priority rating or a low priority rating to each actor that it detects. The vehicle will then generate a forecast for each of the detected actors. Some of not all high priority actors will receive a high resolution forecast. Low priority actors, and optionally also some of the high priority actors, will receive a low resolution forecast. The system will the forecasts to predict actions for the actors. The autonomous vehicle will then use the predicted actions to determine its trajectory.

20 Claims, 9 Drawing Sheets

(56) References Cited

U.S. PATENT DOCUMENTS

2020/0159215 A1    5/2020  Ding et al.
2020/0201325 A1*   6/2020  Parekh ................. G05D 1/0088
2020/0202714 A1*   6/2020  Gesch .............. G08G 1/096725

OTHER PUBLICATIONS

PCT/ISA/210 and PCT/ISA/237 International Search Report and Written Opinion for PCT/US2022/071940, dated Aug. 21, 2022, 14 pages.
Chang, M. et al., "Argoverse: 3D Tracking and Forecasting with Rich Maps," Computer Vision Foundation, pp. 8748-8757.
Zhao, H. et al., "TNT: Target-driveN Trajectory Prediction," pp. 1-12.
International Preliminary Report on Patentability dated Dec. 14, 2023 for PCT Appn. No. PCT/US2022/071940 filed Apr. 26, 2022, 10 pgs.

\* cited by examiner

METHOD AND SYSTEM FOR PREDICTING BEHAVIOR OF ACTORS IN AN ENVIRONMENT OF AN AUTONOMOUS VEHICLE

BACKGROUND

As an autonomous vehicle (AV) moves about an environment, its perception system will detect many actors that are moving, or which may move, within or near the AV's path of travel. The AV will predict what some or all of the detected actors will do. The AV's motion planning system will then consider these predictions when determining what trajectory that the AV will follow to avoid conflict with the other actors.

As the AV and the other actors continue to move, the AV will continuously collect new perception data about the other actors. The AV will use the new data to update its predictions about what the other actors will do. The AV will use the updated predictions to determine whether to continue along, or to alter, its trajectory. Due to the inherent uncertainty in traffic behavior, the AV may generate more than one candidate prediction for a particular actor.

This is a computationally intensive process. When the AV detects multiple actors, predicting and considering each actor's intentions requires significant processing time, stored energy, memory to store the data, and other AV resources. In addition, because AVs must operate and make decisions in real-time, the AV may need to make some of the computations within specified time constraints.

To resolve this, some systems prioritize other actors and make binary decisions as to whether or not an actor is a high-priority agent or not. These systems then only make predictions only for high-priority agents. This can lead to either (a) the omission of an actor for whom a prediction is needed, or (b) violation of run-time processing constraints if too many actors are classified as high-priority agents.

Therefore, improvements in AV prediction processes are needed. This document describes methods and systems that are directed to addressing the problems described above, and/or other issues.

SUMMARY

This document describes methods by which an autonomous vehicle may predict actions of other actors who are in an environment through which the autonomous vehicle is traveling. To do this, a perception system of an autonomous vehicle will detect various actors that are proximate to the autonomous vehicle. For each of the detected actors, the perception system will assign a priority rating to the detected actor. Each actor may be either a high priority actor and or a low priority actor, and each of these ratings may have one or more subdivisions within them that indicate a relative score or other measurement of priority.

A forecasting system of the autonomous vehicle will then, over each of multiple cycles, generate a forecast for each of the detected actors. For at least some of the high priority actors, the forecast will be a high resolution forecast. For each of the low priority actors, and optionally also some of the high priority actors, the system will generate a low resolution forecast. The system will save each of the forecasts in a data store in association with the actor for whom the forecasts were generated. The forecasting system will then use at least some of the high resolution forecasts to predict one or more actions for at least some of the high priority actors, and it will use at least some of the low resolution forecasts to predict one or more actions for each of the low priority actors. A motion planning system of the autonomous vehicle will then use the predicted actions to determine a trajectory for the autonomous vehicle.

In some embodiments, after any cycle has completed, the perception system may analyze the high resolution forecasts, the low resolution forecasts and their likelihoods for the current cycle and for one or more of the prior cycles to determine overall high resolution forecasts for at least some of the high priority actors and overall low resolution forecasts for at least some of the low priority actors.

In some embodiments, when generating the high resolution forecast for a high priority actor, the system may detect a path-influencing characteristic of a scene in which the high priority actor is traveling. The path-influencing characteristic is a characteristic that may cause the actor to alter its path of travel. The system will then use the path-influencing characteristic to determine candidate high resolution forecasts, at least some of which follow different trajectories. However, for each of the low priority actors, the system will not use any path-influencing characteristics of the scene in which the low priority actor is traveling to determine the low resolution forecast.

In some embodiments, before assigning the priority ratings to the detected actors, the perception system may identify a time budget representing a total amount of time available to generate forecasts for all of the detected actors. The system will also determine a first amount of time that equals the time required to generate the low priority forecasts. It will then determine a second amount of time that equals the time available to generate the high priority forecasts by subtracting the first amount of time from the total amount of time available. The system will determine the number of high priority forecasts that can be generated during the second amount of time. Then, when assigning the priority ratings to the detected actors, the system will assign high priority ratings to up to that number of the detected actors, and it will assign low priority ratings to any remainder of the detected actors. Optionally, to determine the first amount of time, the system may determine the time required to generate low priority forecasts for all of the detected actors.

In some embodiments, generating the forecasts for the detected actors may include generating low resolution forecasts for all of the detected actors before generating any high resolution forecasts for any of the high priority actors. If so, then before the motion planning system uses the predicted actions to determine the selected trajectory for the autonomous vehicle, the forecasting system may determine whether the forecasting system actually generated high resolution forecasts for all high priority actors, and it will notify the motion planning system when the forecasting system does not generate high resolution forecasts for all of the high priority actors.

Optionally, when the motion planning system uses at least some of the high resolution candidate forecasts to determine the trajectory for the autonomous vehicle, the system may determine which of the high resolution candidate forecasts are relevant to a motion planning operation of the autonomous vehicle. Then, when determining the selected trajectory for the autonomous vehicle, the system may use the high resolution candidate forecasts that are relevant to the motion planning operation, and it may not use any of the high resolution candidate forecasts that are not relevant to the motion planning operation.

In some embodiments, to assign the priority rating to each detected actor, the system may estimate a velocity of the detected actor, and it may use the estimated velocity of the detected actor and a velocity of the autonomous vehicle to measure whether the detected actor can reach the autonomous vehicle within a time horizon. If the detected actor cannot reach the autonomous vehicle within the time horizon, then the system may determine that the detected actor is a low priority actor, otherwise the system may determine that the detected actor may be a high priority actor In some embodiments, to assign the priority rating to each detected actor, the system may determine a region of interest that surrounds the autonomous vehicle, and it may assess whether the detected actor is within the region of interest. If the detected actor is not within the region of interest, then the system may determine that the detected actor may be a low priority actor, otherwise the system may determine that the detected actor may be a high priority actor.

In some embodiments, to assign the priority rating to each detected actor, the system may identify a first path in which the detected actor is traveling and a second path in which the autonomous vehicle is traveling. The system may assess whether the first path may conflict with the second path within a region of interest. If the first path will not conflict with the second path within the region of interest, then the system may determine that the detected actor may be a low priority actor, otherwise the system may determine that the detected actor may be a high priority actor.

Optionally, in the embodiment described above, the second path may be a street along which the autonomous vehicle is traveling. If so, then assessing whether the first path may conflict with the second path may include assessing that the first path may conflict with the second path if any of the following characteristics are present: (a) the first path is a lane segment that intersects the street within the region of interest; (b) the first path is a crosswalk that intersects the street within the region of interest; or (c) the first path is a lane segment of the street and has a nominal direction that matches a direction of travel of the autonomous vehicle. Alternatively or in addition, to assess whether the first path may conflict with the second path within the region of interest, the system may determine that the first path will not conflict with the second path if the first path is a lane segment that is separated from the street by a physical barrier. Alternatively or in addition, to assess whether the first path may conflict with the second path within the region of interest, the system may determine that the first path will not conflict with the second path if: (a) the first path and the second path are the same street; and (b) the other actor is behind the autonomous vehicle and moving in a same direction but at a lower speed than the autonomous vehicle.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An autonomous vehicle (AV) must be able to predict the future trajectories of actors that it detects in its environment in order to make safe and efficient behavior decisions. Before determining the actor's candidate trajectories, the AV must determine an intent of the actor—that is, what is the actor's high-level plan, regardless of how the actor may execute that plan. The root of all forecasting begins at inferring the actor's likely intentions and storing them as a set of possible intentions. Example intentions (which we may also refer to as intents or goals) include "cross the street" (if a pedestrian), "park" or "turn right" (if a vehicle), or any other number of possible high-level actions that a moving actor may take on or near a road.

This document describes novel approaches by which an AV may predict intents and actions of other detected actors using a method of prioritization that improves computational efficiency and processing time, while also retaining some or all of the predicted actions for consideration in a motion planning process.

Figure 1:
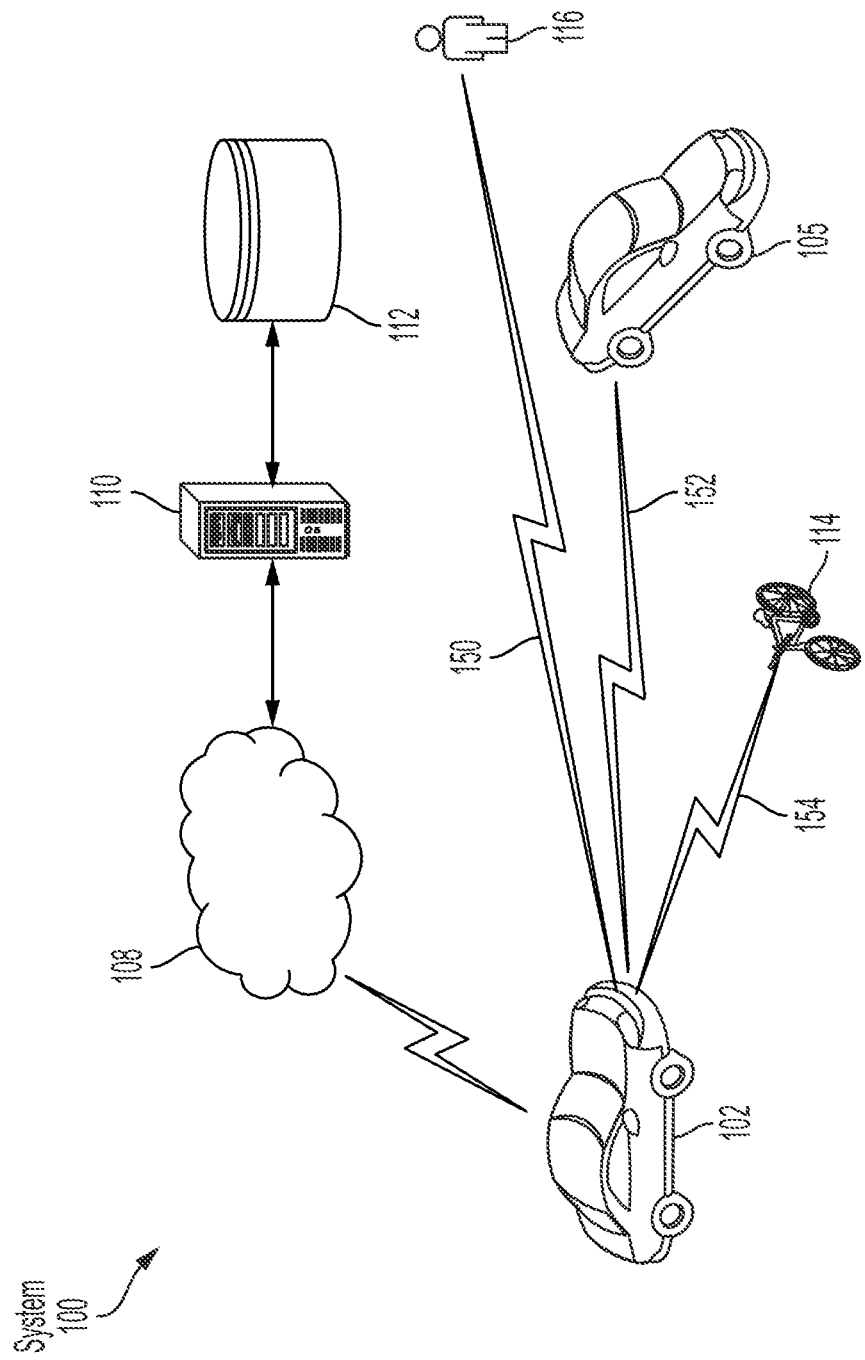
FIG. 1 illustrates how an autonomous vehicle may perceive various other actors in an environment in which the vehicle is moving or will move.

Before discussing the current approaches, it is useful to describe how an AV may perceive an actor in an environment. FIG. 1 illustrates an example system 100 that includes a vehicle 102 that is traveling along a road in a semi-autonomous or autonomous manner. Vehicle 102 may be an AV. The AV 102 can be, but is not limited to, a land vehicle (as shown in FIG. 1), an aircraft, or a watercraft.

AV 102 is generally configured to detect other objects such as actors 105, 114, 116 within the range and field of detection of its sensors. The actors can include, for example, another vehicle 105, a cyclist 114 (such as a rider of a bicycle, electric scooter, motorcycle, or the like) and/or a pedestrian 116. This object detection can be made, for example, by analyzing sensor data generated by at least one sensor device on the AV 102 and/or information received from a communication device (e.g., a transceiver, a beacon and/or a smart phone) of the object via communication link(s) 150, 152, 154. The communication link(s) 150, 152, 154 can include, but are not limited to, V2X communication links. The term "V2X" refers to a communication between a vehicle and any entity that may affect, or may be affected by, the vehicle.

When such a detection is made, AV 102 performs operations to: generate one or more possible actor trajectories (or predicted paths of travel) for the detected actor; and use at least one of the generated possible object trajectories (or predicted paths of travel) to facilitate a determination of a vehicle trajectory for the AV. The AV 102 may then perform operations to follow the vehicle trajectory.

In some scenarios, the AV 102 performs additional operations to determine whether or not there is an undesirable level of risk that the AV will come within a threshold distance from the actor in a threshold period of time (e.g., 1 minute). If so, the AV 102 performs operations to determine whether that situation can be avoided if the AV 102 follows the vehicle trajectory and performs any of multiple dynamically generated emergency maneuvers in a defined time period (e.g., N milliseconds). If the situation can be avoided, then the AV 102 takes no action or optionally performs a cautious maneuver. (For example, the AV 102 may mildly slow down.) In contrast, if the situation cannot be avoided, then the AV 102 immediately takes an emergency maneuver (e.g., brakes and/or changes direction of travel).

In some embodiments, the AV may include or be in communication with a data store having a set of goals that may be assigned to various classes of actors. For example, the data set may include data indicating that a vehicle class of actor may be associated with goals that include: (i) lane following (i.e., an intention to follow mapped lanes in the environment); (ii) an unmapped maneuver (such as k-turns, illegal U-turns, or turning into a parking garage); (iii) parked or parking; and/or (iv) lane blocking (such as by double-parking or otherwise stopping in and at least partially obstructing a lane). The data set may indicate that a pedestrian class of actor may be associated with goals such as crossing a street at a crosswalk, jaywalking, entering a parked vehicle, or other goals.

Figure 2:
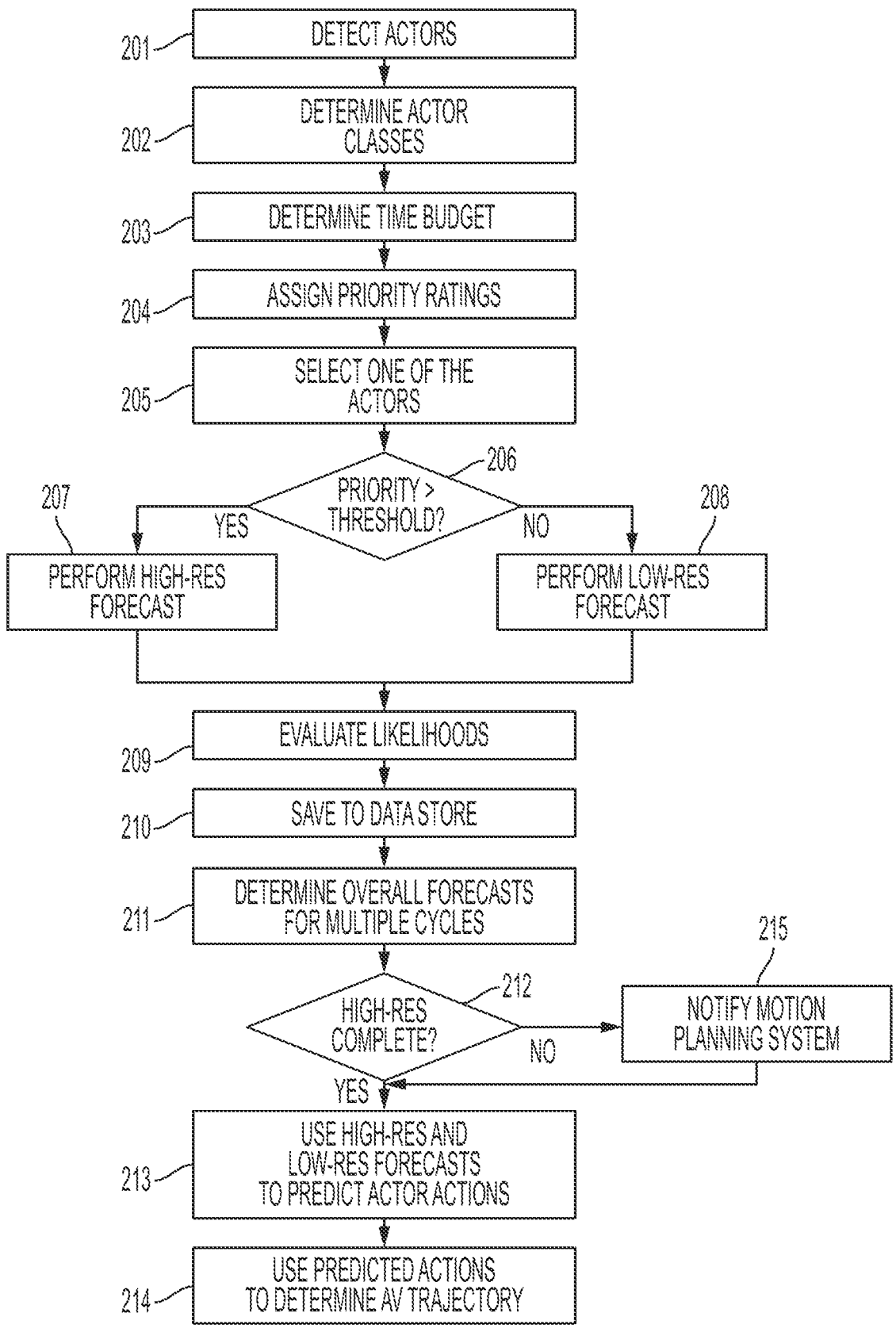
FIG. 2 illustrates an example detected actor prioritization process

FIG. 2 demonstrates example steps of a method by which an AV may make run-time prioritization assessments of other actors that the AV encounters as the AV moves about its environment. At 201 the AV's perception system will detect multiple other actors, using methods such as those discussed above and below. At 202 the AV's perception system will process the data it collects to determine a class of the actor, such as vehicle, pedestrian, etc., again using methods such as those discussed above and below. At 203 the AV's perception system may determine a time budget t_Budget that is the available time to create forecasts for detected actors in an environment, and it may determine how much of this budget is available for high resolution forecasts. The time budget may be a fixed number, or it may be a variable that is changed based on factors such as the type of environment (example: city vs rural), speed of the AV's travel, features of the AV's trajectory (example: intersection vs. open road) or other parameters. This determination of how much of this budget will be available for high resolution forecasts will be discussed in more detail below. At 204 the perception system of will assign a priority rating to each detected actor. The priority ratings will be either a high priority actor rating or a low priority actor rating. The priority ratings also may include various grades (i.e., sublevels) within these general categories, but each such grade will fall within one of these two categories.

The system may assign the priority rating as a binary decision—that is, it may determine that the actor is a high priority actor if it meets any of the criteria for high priority ratings discussed below. Alternatively, the system may use a rule or a scoring function that considers any or all of the criteria discussed below, and/or other criteria. Optionally, the function may vary depending on how many actors are detected and how much processing time is available, as will be discussed below.

For example, when assigning the priority rating the system's perception system may estimate a velocity of the detected actor. The estimated velocity may be measured from data captured by the AV's LiDAR system, cameras, or other sensors. Alternatively, the system may estimate the actor's velocity to be equal to or a function of a posted speed limit of the road (as detected from map data or camera data)—for example, the estimated velocity of a vehicle traveling on a road may be the posted speed limit of the road. As another alternative, the system may estimate the velocity of the vehicle by using a physics-based motion model and estimating the worst-case velocity using the highest velocity physically possible for the detected object type. In any of these situations, the system may then use the estimated velocity of the detected actor and a velocity of the AV (as reported by the AV's onboard systems) to measure whether the detected actor can reach the AV within a time horizon, assuming that the other actor and the AV maintain their speeds. If the other actor cannot reach the AV within the time horizon, then the system may assign a low priority to the other actor; otherwise, the system may assign a high priority to the other actor. For example, the system may use the basic equation of D(istance)=V(elocity)*T(ime) for the AV and the actor to determine when the actor will catch up to the AV.

Figure 3:
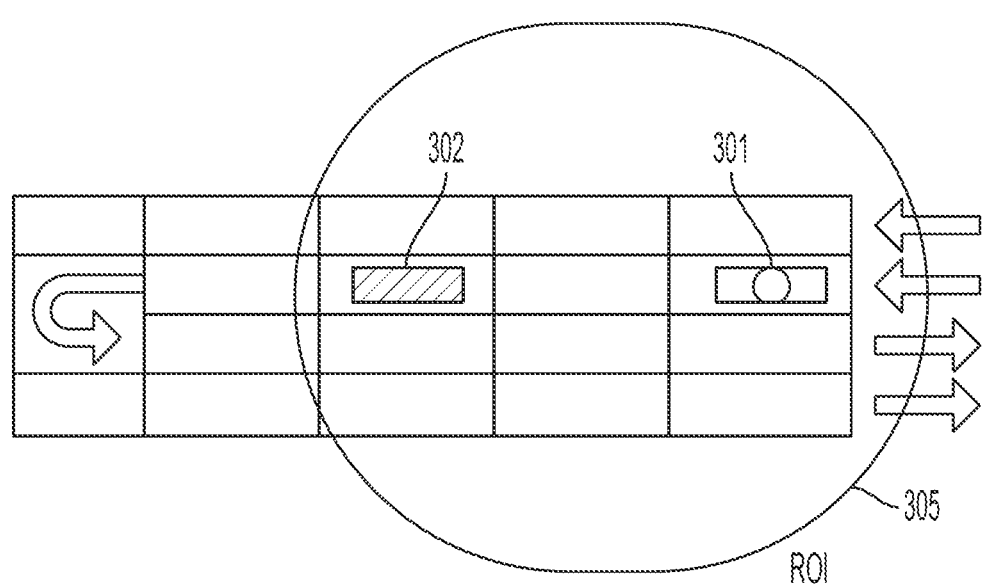
FIG. 3 illustrates an example process by which another actor may be assigned a high priority or a low priority.

As another example of assigning priority ratings, referring to FIG. 3, the system may determine a region of interest (ROI) 305 that surrounds the AV 301. The ROI 305 may simply be a circle formed by a radius of a certain distance around the AV 301 as shown, or it may be another shape such as an oval or rectangle with dimensions that are determined as a function of boundaries of the road on which the AV 301 is traveling, its speed, and/or other features. The system may assess whether the detected actor 302 is within the ROI 305. If the detected actor 302 is not within the ROI 305, the system may assign a low priority rating to the detected actor 302. Otherwise, as shown in FIG. 3 in which the other actor 302 is within the ROI 305, the system may determine that the detected actor 302 may be a high priority actor, which may be its final determination or simply a factor that makes the actor 302 a candidate to be a high priority actor.

Figure 4:
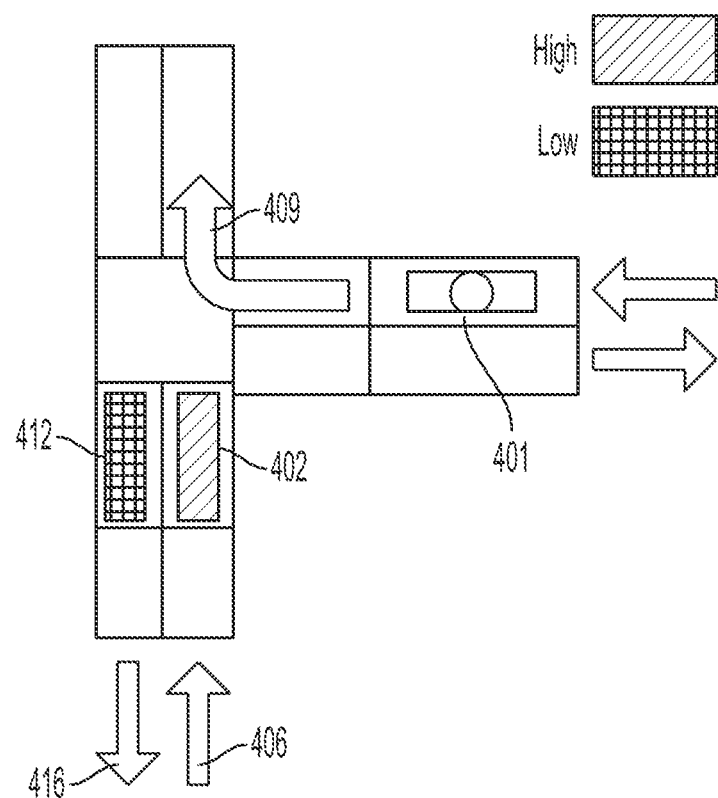
FIG. 4 illustrates another example process by which another actor may be assigned a high priority or a low priority.

Another example priority rating process considers another actor to be high priority or low priority depending on the road topology, and in particular depending on the lane segments in which the AV and other actor are traveling. For example, as shown in FIG. 4, the AV 401 (which we may consider to be a first actor) is traveling along a first path 409. A second actor 402 is traveling along a second path 406, and a third actor 412 is traveling along a third path 412. Because the first path 409 and the second path 406 may conflict within the region of interest depicted in FIG. 4, the system may assign a high priority to the second actor 402. However, because the first path 409 and the third path 416 do not conflict within the region of interest depicted in FIG. 4, the system may assign a low priority to the third actor 412.

The system may consider other features in addition to, or as variations of those depicted in FIG. 4. For example:

- if the other actor is traveling along a path that includes a lane segment that intersects the AV's street within the region of interest, then the system may assign a high priority to the other actor;
- if the other actor is a pedestrian and/or the other actor is traveling on a crosswalk that intersects the street within the region of interest, or then the system may assign a high priority to the other actor, especially if the other actor is moving toward (and not away from) the AV's lane of travel;
- if the other actor is traveling along a lane segment of the street that the AV is in, and the lane segment has a nominal direction that matches a direction of travel of the AV, then the system may assign a high priority to the other actor;

if the other actor is traveling along a lane segment that shares no drivable area with the AV (for example, if the other actor is separated from the AV's lane by a physical barrier), then the system may assign a low priority to the other actor; and if the other actor is behind the AV, and in the same lane as the AV, and moving in the same direction as but at a lower speed than the AV, then the system may assign a low priority to the other actor.

Before or after assigning the priority ratings to the detected actors, then as noted above at step 203 the system may determine how many of the detected actors can be processed as high priority and how many must be processed as low priority. To do this, the system may calculate the total number N of actors detected in the scene, and it may identify an amount of time available (t_HF) to process high fidelity (i.e., high resolution) forecasts for a subset of the detected actors by (i) identifying the time required to create low fidelity (i.e., low resolution) forecasts for all N actors (N*t_LF) and (ii) subtracting that time from the total time available for forecasting t_Budget. The portion of the time budget t_Budget that remains after all low fidelity forecasts can be completed is then available for high frequency forecasts: t_HF=t_Budget−N*t_LF. The system can then divide the time available for high fidelity forecasts t_HF by the time expected for each high resolution forecast to yield a maximum number of actors $N_{hp-max}$ that can be classified as high priority actors. (Although as will be described below the time "expected" for each high resolution forecast is not necessarily a budget or a restriction, but instead an estimated time that is commonly expected for high resolution forecasts.) Alternatively, the system may use the maximum number of actors $N_{hp-max}$ as the number of actors who can be processed with high-resolution forecasts. Either way, the system can then process either high resolution forecasts or low resolution forecasts for all of the detected actors within the time budget t_Budget. Then, when assigning the priority ratings to the detected actors, the system can assign high priority ratings to up to $N_{hp-max}$ of the detected actors, and it can assign low priority ratings to the remainder of the detected actors.

Returning to FIG. 2, since the scene that the AV's perception system sees is constantly changing, the system will continue to collect data such as that described above, and it will assign priority ratings for over multiple cycles. In each cycle, at 205 the system will select each actor, and for each actor at 206 the system will determine whether the actor's priority rating is above a threshold or not above the threshold. If the time budget t_Budget was used to determine how many actors could be classified as high priority, then the threshold may simply be a binary assessment of whether the actor is classified as high priority or low priority. If the time budget t_Budget was not used to determine how many actors could be classified as high priority, then the system may be a numeric, grade-based or class-based threshold in which only those high priority actors who exceed the threshold will get high resolution forecasts, while not-quite-as-high priority actors (i.e., those below the threshold) will get low resolution forecasts.

The system will then generate candidate forecasts for each of the detected actors by generating one or more high resolution candidate forecasts for each high priority actor (at 207), and by generating a low resolution candidate forecast for each low priority actor (at 208). Optionally, the system may generate low resolutions forecasts for all actors, regardless of priority, before then generating the high priority forecasts. Either way, low priority actors will not be ignored, and all actors may receive at least one forecast. Even though low priority actors may not be expected to interact with the AV, the system will still generate at least one low resolution candidate forecast for each low priority actor.

"High resolution" vs "low resolution" means that high resolution forecasts are expected to be more precise than low resolution forecasts. This is because high resolution forecasts will consider more dynamic inputs and/or more complex models than low resolution forecasts. In addition, low resolution forecasts may be generated within fixed time budgets, using time-deterministic forecasting models that do not depend on dynamic inputs such as lane geometry; in contrast, high resolution forecasts will not necessarily have a time budget, and they will consider lane geometry and/or other dynamically changing inputs from vehicle sensors. For example, when generating the high resolution forecasts for a high priority actor, the system may detect one or more path-influencing characteristics of a scene in which the high priority actor is traveling. The path-influencing characteristics are characteristics that may cause the actor to alter its path of travel. For example, consider a vehicle that approaches a four-way intersection. The branched road at the intersection may cause the vehicle to continue forward, or the vehicle may alter its trajectory by turning left or turning right. High resolution candidate forecasts may include forecasts for each of these possible trajectories. A low resolution forecast may be a forecast that presumes that the actor continues forward, without turning at the intersection, because the low resolution forecast will be independent of dynamic inputs such as the road network at a particular location. Thus, the system will use one or more of the path-influencing characteristics of the scene to determine the high resolution forecasts, but it will not use any path-influencing characteristics of the scene to determine the low resolution forecast.

Returning to FIG. 2, at 209 if the system generates multiple candidate high resolution and/or low resolution forecasts for any of the actors, the system may evaluate a likelihood of each of the candidate forecasts, and at 210 it will save the candidate forecasts and their likelihoods in a data store in association with the actor for whom the intentions were generated. Likelihoods may be generated using any possible scoring function, including but not limited to binary likelihoods (i.e., likely or not) using criteria such as whether the trajectory would result in sudden acceleration or deceleration, or a sudden turn, or violation of a traffic rule. Additional methods will be discussed below in the context of FIGS. 5A-5C.

At 213 a forecasting system of the autonomous vehicle will then use at least some of the high resolution candidate forecasts and at least some of the low resolution candidate forecasts to predict actions for the actors, and at 214 a motion planning system of the vehicle will use the predicted actions determine a selected trajectory for the autonomous vehicle. Any suitable trajectory planning processes may be used, including but not limited to those that will be described in more detail below.

Optionally, using the predicted actions to determine the trajectory for the AV may include determining which of the actors' actions are relevant to a motion planning operation of the AV. For example, if a candidate forecast cannot conflict with the AV's path during the time horizon under any feasible forecasted trajectory, then the system may determine that the action (or actor) is not relevant to the AV's motion planning operations. Then, when determining the selected trajectory for the autonomous vehicle, the system may only consider candidate forecasts that are relevant to the motion planning operation and not use the candidate forecasts that are not relevant to the motion planning operation.

Optionally, as noted in FIG. 2 at 211 after any current cycle has completed, the AV's perception system may analyze the high resolution candidate forecasts for the current cycle and for one or more of the prior cycles to determine overall high resolution candidate forecasts for at least some of the high priority actors. At 213 the system also (or alternatively) may analyze the low resolution forecasts for the current cycle and for one or more of the prior cycles to determine one or more overall low resolution forecasts for at least some of the low priority actors. Then when the system uses forecasts to influence the selected trajectory for the autonomous vehicle at 214, it may use at least some of the overall high resolution and/or low resolution forecasts.

Figure 5:
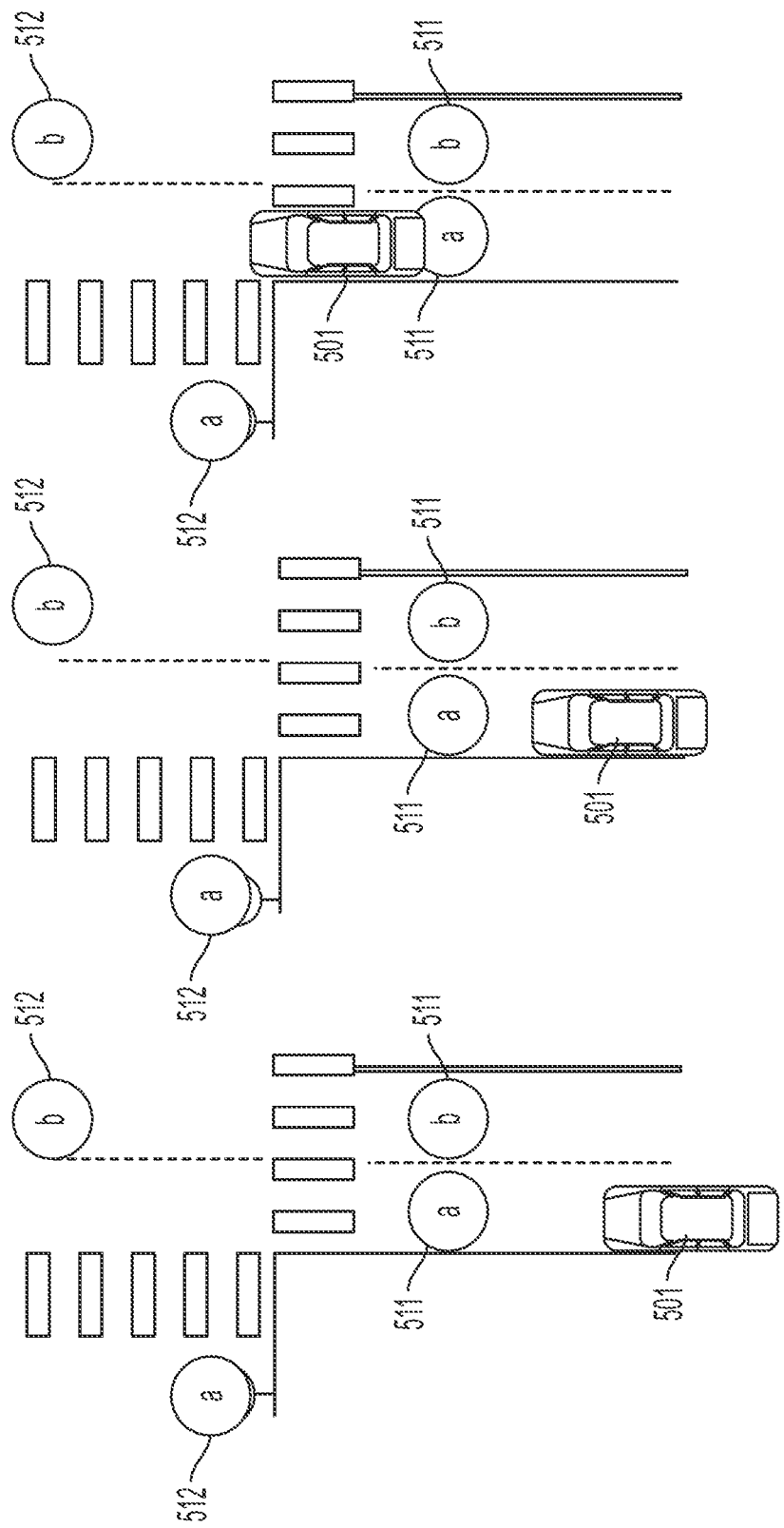
FIGS. 5A-5C illustrate an example process of inferring candidate intents of an actor and updating the likelihoods of each intent over time.

Optionally, as noted above at 209 the system may determine likelihoods of candidate forecasts by using the data from additional cycles to determine and refine the overall likelihoods of each candidate forecast. For example, FIGS. 5A-5C illustrate progression of an actor 501 toward various goals over multiple cycles in time. In FIG. 5A, at time t0 the actor 501 is approaching candidate lane following goals 511a and 511b. Initially, the system may determine that goal 511a is more likely than 511b because the vehicle is currently in the lane of goal 511a. In FIG. 5B, at time t1 the actor 501 continues in the same lane goal 511a, has not signaled an intent to switch lanes, and is in a position where the dynamics of changing lanes to reach goal 511b would be result in a sudden, harsh movement. In view of any or all of these factors, the system will increase the value of the likelihood of goal 511a and correspondingly decrease the likelihood of goal 511b. In FIG. 5C at time t2 the vehicle has reached the end of the lane corresponding to goal 511a so the system then considers a next set of goals, which may include a left turn goal 512a and/or a parking goal 512b. In addition, FIGS. 5A and 5B show that the consider may consider relative likelihoods of multiple goal sets 511a-b and 512a-b and consider the relative likelihoods of each goal within the set before the actor 501 completes any of the goals within one of the set or makes movements that render goals in a set to be impossible.

Returning to FIG. 2, at 213 a motion planning system of the autonomous vehicle will use one or more of the predicted actor actions to influence a selected trajectory for the autonomous vehicle. For example, as described above, the AV may avoid or alter a planned path that is likely to conflict with a trajectory of the actor that is associated with a goal having a likelihood that exceeds a threshold. Optionally, if the vehicle is equipped with an on-board display device, the goals for that actor that have a likelihood that exceeds a threshold, or the most likely goals for the actor, may be output on the display for viewing by a vehicle operator.

Optionally, at 215 the system may determine whether all high-resolution forecasts were completed. For example, if the system's time budget expected that N high priority actors would receive high priority forecasts, but circumstances prevented the system from generating high resolution forecasts for all N high priority actors, then at 215 the forecasting system may notify the motion planning system of this so that the motion planning system can consider this when planning its trajectory or taking other actions, such as coming to a stop or following a more conservative trajectory, using the low-priority and (if any) high priority forecasts that are available. As another example, if the system classified X actors as high priority but the time budget only allowed high resolution processing of a subset of the X high priority actors, then at 215 the forecasting system may notify the motion planning system of this for similar purposes.

Figure 6:
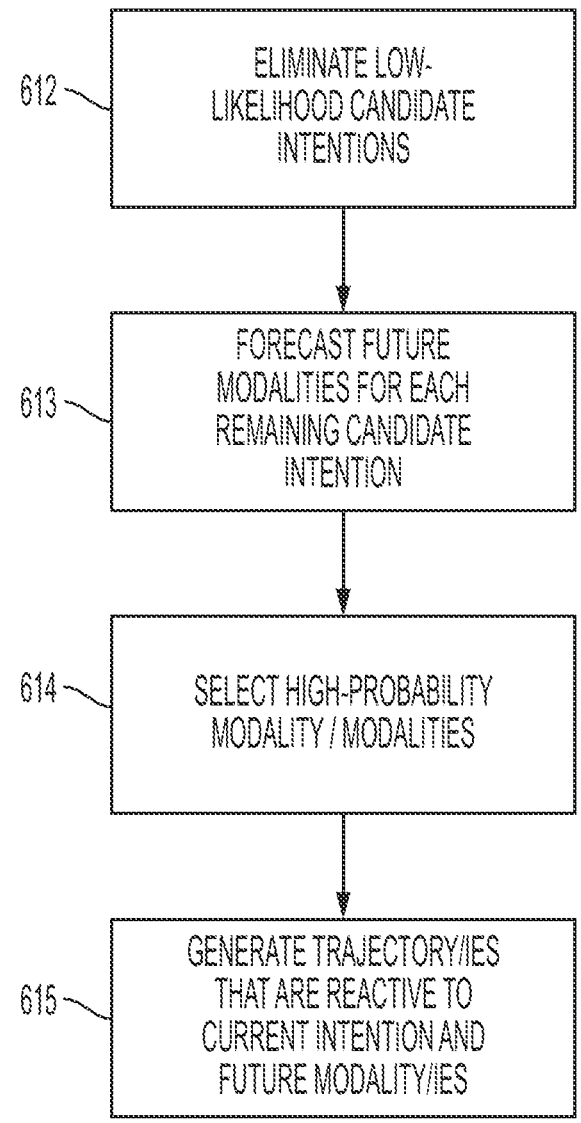
FIG. 6 illustrates additional detail about certain steps of the process of FIG. 2.

FIG. 6 illustrates another example of how the AV's motion planning system may use one or more of the candidate forecasts and their likelihoods to influence a selected trajectory for the autonomous vehicle (step 209). At 612, the system may first filter out candidate forecasts having likelihoods that are below a threshold, so that the next step is only performed for candidate forecasts having relatively high likelihoods. At 613, for at least some of the candidate forecasts, the forecasting system will forecast a future modality (i.e., a subsequent goal that the actor may have after reaching the current goal) and assign a probability to each forecasted future modality. At 614 the forecasting system may select a relatively high probability future modality, at 615 the system may select a trajectory that is consistent with both the current inferred intent and more of the forecasted modalities having a probability that exceeds a threshold.

Some goals may be regarded as exclusive to each other over time, such a lane change goal and a nominal lane goal. In such situations it may make sense for the system to jointly track the likelihoods, using a multiclass hidden Markov model (HMM). Alternatively, the system may reason about and fit individual binary HMMs with multiple sources of evidence, alone or in combination with a multiclass HMM.

Figure 7:
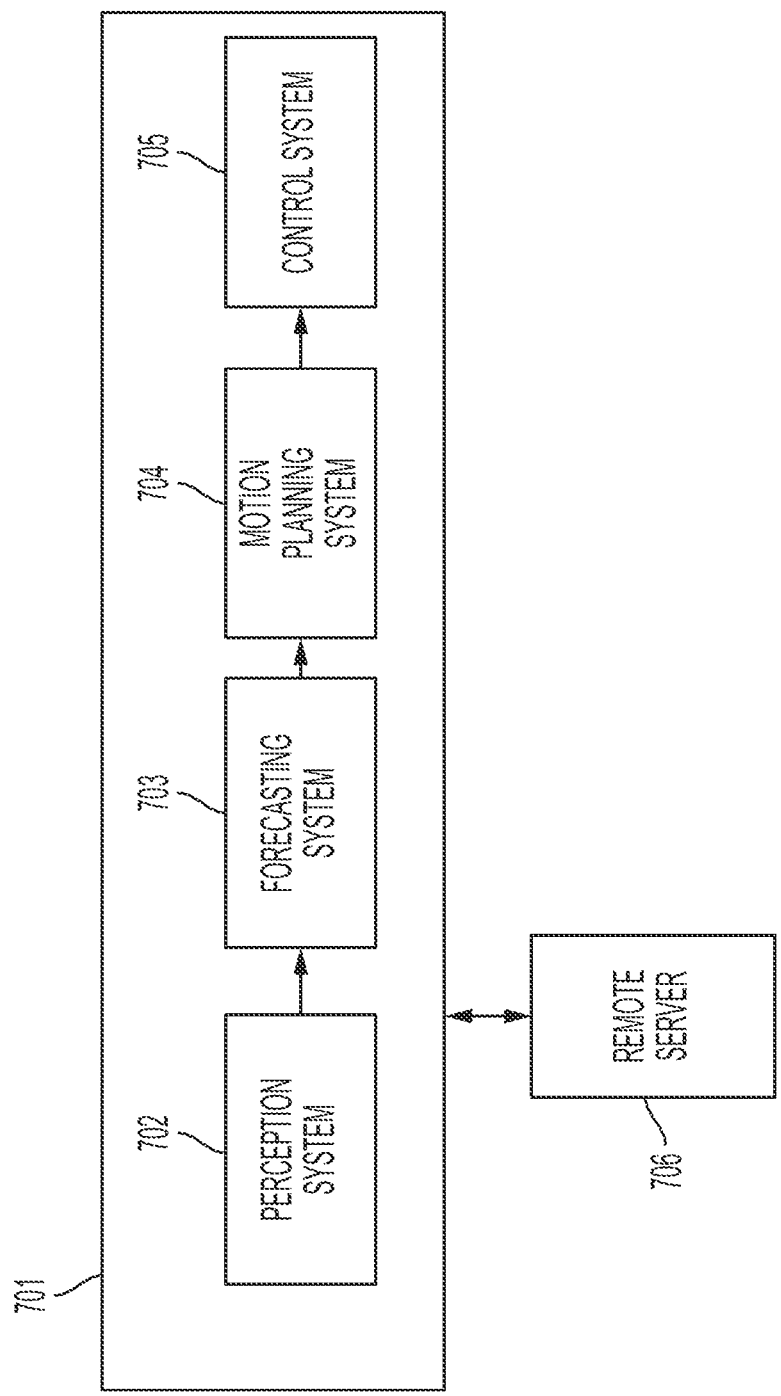
FIG. 7 is a block diagram illustrating various high-level systems of an autonomous vehicle.

FIG. 7 shows a high-level overview of AV subsystems that may be relevant to the discussion above. Specific components within such systems will be described in the discussion of FIG. 8 later in this document. Certain components of the subsystems may be embodied in processor hardware and computer-readable programming instructions that are part of the AV's on-board computing system 701. The subsystems may include a perception system 702 that includes sensors that capture information about moving actors and other objects that exist in the vehicle's immediate surroundings. Example sensors include cameras, LiDAR sensors and radar sensors. The data captured by such sensors (such as digital image, LiDAR point cloud data, or radar data) is known as perception data.

The perception system may include one or more processors, and computer-readable memory with programming instructions and/or trained artificial intelligence models that, during a run of the AV, will process the perception data to identify objects and assign categorical labels and unique identifiers to each object detected in a scene. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in "Yurtsever et al., A Survey of Autonomous Driving: Common Practices and Emerging Technologies," published in *IEEE Access*, April 2020.

The vehicle's perception system 702 may deliver perception data to the vehicle's forecasting system 703. The forecasting system (which also may be referred to as a prediction system) will include processors and computer-readable programming instructions that are configured to process data received from the perception system and forecast actions of other actors that the perception system detects. A typical forecast will be a trajectory, but it alternatively may be a prediction that the actor will remain still. The forecast may include other parameters that reflect actions that the actor may take as well.

The vehicle's perception system, as well as the vehicle's forecasting system, will deliver data and information to the vehicle's motion planning system 704 and control system 705 so that the receiving systems may assess such data and initiate any number of reactive motions to such data. The motion planning system 704 and control system 705 include and/or share one or more processors and computer-readable programming instructions that are configured to process data received from the other systems, determine a trajectory for the vehicle, and output commands to vehicle hardware to move the vehicle according to the determined trajectory. Example actions that such commands may cause include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in *IEEE Transactions on Intelligent Transportation Systems*, vol. 17, no. 4 (April 2016).

During deployment of the AV, the AV receives perception data from one or more sensors of the AV's perception system. The perception data may include data representative of one or more objects in the environment. The perception system will process the data to identify objects and assign categorical labels and unique identifiers to each object detected in a scene.

Figure 8:
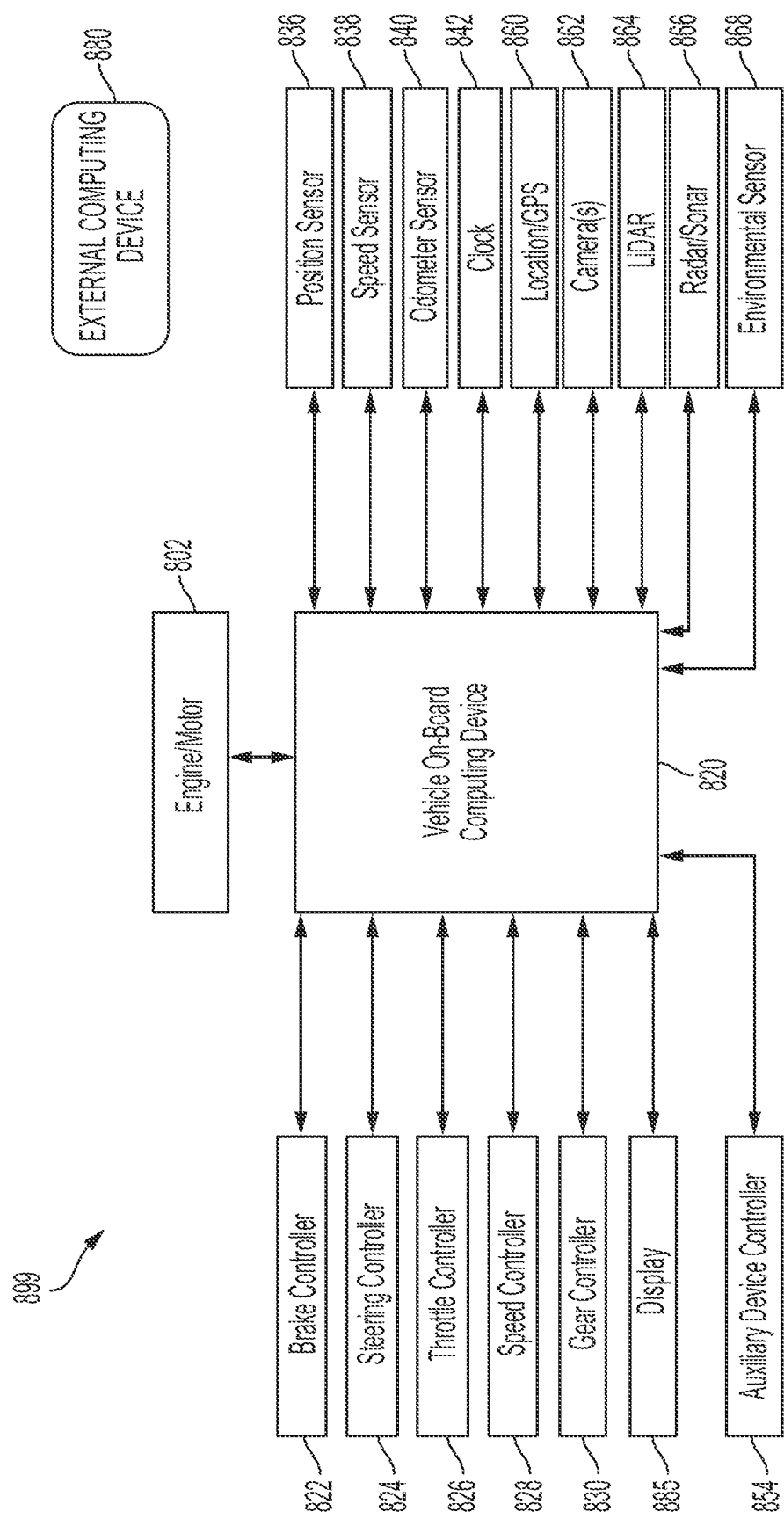
FIG. 8 illustrates examples of specific hardware that may make up the systems of FIG. 7.

FIG. 8 illustrates an example system architecture 899 for a vehicle, such as an AV. The vehicle includes an engine or motor 802 and various sensors for measuring various parameters of the vehicle and/or its environment. Operational parameter sensors that are common to both types of vehicles include, for example: a position sensor 836 such as an accelerometer, gyroscope and/or inertial measurement unit; a speed sensor 838; and an odometer sensor 840. The vehicle also may have a clock 842 that the system uses to determine vehicle time during operation. The clock 842 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 860 such as a global positioning system (GPS) device; object detection sensors such as one or more cameras 862; a LiDAR sensor system 864; and/or a radar and or and/or a sonar system 866. The sensors also may include environmental sensors 868 such as a precipitation sensor and/or ambient temperature sensor. The object detection sensors may enable the vehicle to detect moving actors and stationary objects that are within a given distance range of the vehicle 599 in any direction, while the environmental sensors collect data about environmental conditions within the vehicle's area of travel. The system will also include one or more cameras 862 for capturing images of the environment. Any or all of these sensors will capture sensor data that will enable one or more processors of the vehicle's on-board computing device 820 and/or external devices to execute programming instructions that enable the computing system to classify objects in the perception data, and all such sensors, processors and instructions may be considered to be the vehicle's perception system. The vehicle also may receive information from a communication device (such as a transceiver, a beacon and/or a smart phone) via one or more wireless communication links, such as those known as vehicle-to-vehicle, vehicle-to-object or other V2X communication links. The term "V2X" refers to a communication between a vehicle and any object that the vehicle may encounter or affect in its environment.

During a run of the vehicle, information is communicated from the sensors to an on-board computing device 820. The on-board computing device 820 analyzes the data captured by the perception system sensors and, acting as a motion planning system, executes instructions to determine a trajectory for the vehicle. The trajectory includes pose and time parameters, and the vehicle's on-board computing device will control operations of various vehicle components to move the vehicle along the trajectory. For example, the on-board computing device 820 may control braking via a brake controller 822; direction via a steering controller 824; speed and acceleration via a throttle controller 826 (in a gas-powered vehicle) or a motor speed controller 828 (such as a current level controller in an electric vehicle); a differential gear controller 830 (in vehicles with transmissions); and/or other controllers.

Geographic location information may be communicated from the location sensor 860 to the on-board computing device 820, which may then access a map of the environment that corresponds to the location information to determine known fixed features of the environment such as streets, buildings, stop signs and/or stop/go signals. Captured images from the cameras 862 and/or object detection information captured from sensors such as a LiDAR system 864 is communicated from those sensors) to the on-board computing device 520. The object detection information and/or captured images may be processed by the on-board computing device 820 to detect objects in proximity to the vehicle 800. In addition or alternatively, the AV may transmit any of the data to an external computing device 880 for processing. Any known or to be known technique for performing object detection based on sensor data and/or captured images can be used in the embodiments disclosed in this document.

In addition, the AV may include an onboard display device 885 that may generate and output interface on which sensor data, vehicle status information, or outputs generated by the processes described in this document are displayed to an occupant of the vehicle. The display device may include, or a separate device may be, an audio speaker that presents such information in audio format.

Figure 9:
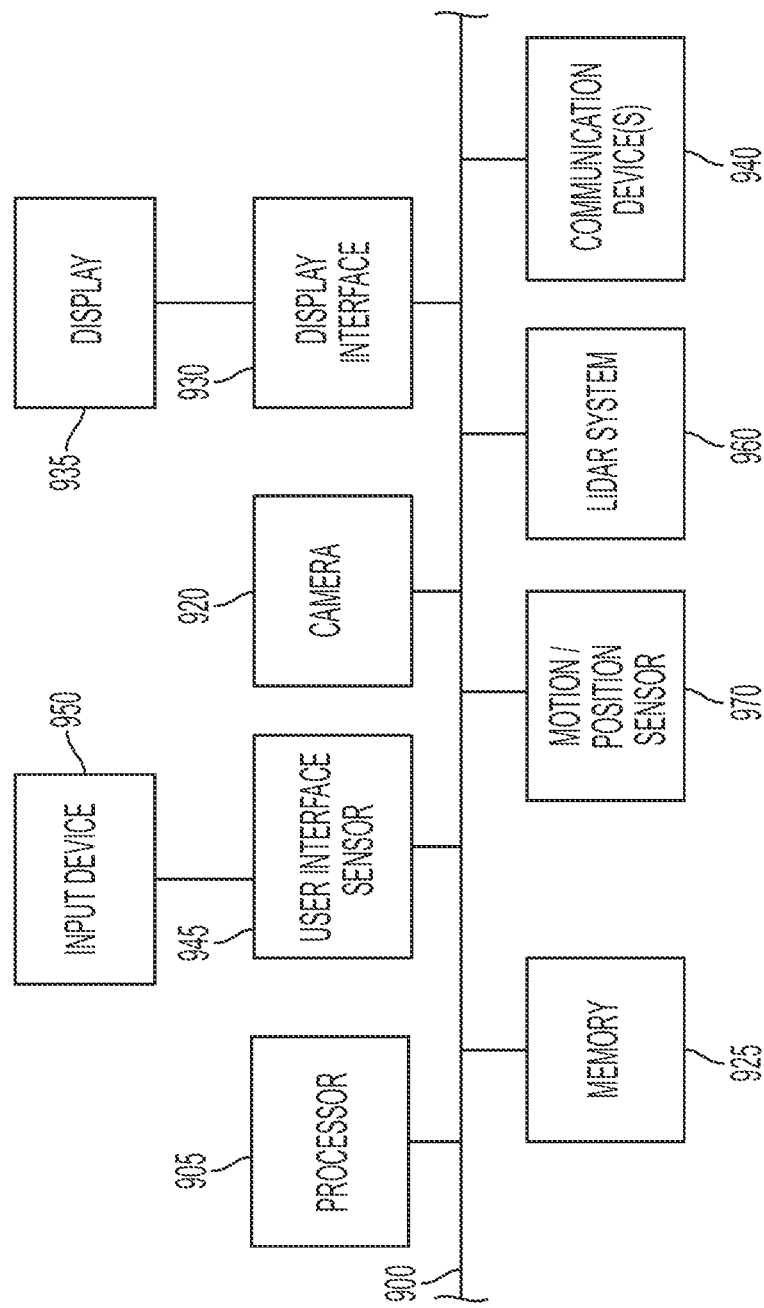
FIG. 9 is a block diagram that illustrates various elements of a possible electronic subsystem of an autonomous vehicle and/or external electronic device.

FIG. 9 depicts an example of internal hardware that may be included in any of the electronic components of the system, such as the onboard computing device of the AV, external monitoring and reporting systems, or remote servers. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 925. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 930 may permit information from the bus 900 to be displayed on a display device 935 in visual, graphic or alphanumeric format, such as an in-dashboard display system of the vehicle. An audio interface and audio output (such as a speaker) also may be provided. Communication with external devices may occur using various communication devices 940 such as a wireless antenna, a radio frequency identification (RFID) tag and/or short-range or near-field communication transceiver, each of which may optionally communicatively connect with other components of the device via one or more communication system. The communication device(s) 940 may be configured to be communicatively connected to a communications network, such as the Internet, a local area network or a cellular telephone data network.

The hardware may also include a user interface sensor 945 that allows for receipt of data from input devices 950 such as a keyboard or keypad, a joystick, a touchscreen, a touch pad, a remote control, a pointing device and/or microphone. Digital image frames also may be received from a camera 920 that can capture video and/or still images. The system also may receive data from a motion and/or position sensor 970 such as an accelerometer, gyroscope or inertial measurement unit. The system also may include and receive data via a LiDAR system 960, when used in the context of autonomous vehicles.

The features and functions disclosed above, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other advanced driver assistance systems.

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

A "trajectory" of an actor that a vehicle's perception or prediction systems may generate refers to the predicted path that the actor will follow over a time horizon, along with the predicted speed of the actor and/or position of the actor along the path at various points along the time horizon.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

The term "classifier" means an automated process by which an artificial intelligence system may assign a label or category to one or more data points. A classifier includes an algorithm that is trained via an automated process such as machine learning. A classifier typically starts with a set of labeled or unlabeled training data and applies one or more algorithms to detect one or more features and/or patterns within data that correspond to various labels or classes. The algorithms may include, without limitation, those as simple as decision trees, as complex as Naïve Bayes classification, and/or intermediate algorithms such as k-nearest neighbor. Classifiers may include artificial neural networks (ANNs), support vector machine classifiers, and/or any of a host of different types of classifiers. Once trained, the classifier may then classify new data points using the knowledge base that it learned during training. The process of training a classifier can evolve over time, as classifiers may be periodically trained on updated data, and they may learn from being provided information about data that they may have misclassified. A classifier will be implemented by a processor executing programming instructions, and it may operate on large data sets such as image data, LIDAR system data, and/or other data.

A "machine learning model" or a "model" refers to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

In this document, when relative terms of order such as "first" and "second" are used to modify a noun, such use is simply intended to distinguish one item from another, and is not intended to require a sequential order unless specifically stated.

The invention claimed is:

1. A method of predicting an action of an actor in an environment through which an autonomous vehicle is traveling, the method comprising:
    by a perception system including one or more first processors of an autonomous vehicle:
        detecting a plurality of actors that that are proximate to the autonomous vehicle based on information received from at least one of a sensor positioned on the autonomous vehicle and a communication device, and
        for each of the detected actors, assigning a priority rating to the detected actor as a high priority actor or a low priority actor;
    by one or more second processors of a forecasting system of the autonomous vehicle for each cycle of a plurality of cycles generating a forecast for each of the detected actors by:
        for at least some of the high priority actors, generating a high resolution forecast,
        for each of the low priority actors, generating a low resolution forecast, and
        saving each of the forecasts in a data store in association with the actor for whom the forecasts were generated;
    by the one or more second processors of the forecasting system of the autonomous vehicle:
        using at least some of the high resolution forecasts to predict one or more actions for at least some of the high priority actors, and
        using at least some of the low resolution forecasts to predict one or more actions for each of the low priority actors;
    by a motion planning system including one or more third processors of the autonomous vehicle, using the predicted actions to determine a trajectory for the autonomous vehicle; and
    by a control system including one or more fourth processors, outputting one or more commands to move the autonomous vehicle based on the determined trajectory,
    wherein the method further comprises, before assigning priority ratings to the detected actors:
        identifying a time budget representing a total amount of time available to generate forecasts for all of the detected actors;
        determining a first amount of time that is a time amount required to generate low priority forecasts;
        determining a second amount of time that is a time amount available to generate high priority forecasts by subtracting the first amount of time from the total amount of time available;
        determining a number of the high priority forecasts that can be generated during the second amount of time; and
        when assigning the priority ratings to the detected actors, assigning high priority ratings to the number of the detected actors and assigning low priority ratings to any remainder of the detected actors,
    wherein identifying the time budget representing a total amount of time available to generate forecasts for all of the detected actors comprises identifying the time budget that is available for the high resolution forecasts, and
    wherein the time budget varies based on at least one of type of a speed of the autonomous vehicle and a trajectory of the autonomous vehicle.

2. The method of claim 1 further comprising:
    by the perception system after any current cycle of the plurality of cycles has completed, analyzing the high resolution forecasts, the low resolution forecasts and their likelihoods for the current cycle and for one or more of the prior cycles to determine overall high resolution intentions for at least some of the high priority actors and overall low resolution intentions for at least some of the low priority actors.

3. The method of claim 1, wherein:
    for at least some of the high priority actors, generating the high resolution forecast for that high priority actor comprises:
        detecting a path-influencing characteristic of a scene in which the high priority actor is traveling, wherein the path-influencing characteristic is a characteristic that may cause the high priority actor to alter its path of travel, and
        using the path-influencing characteristic to determine a plurality of candidate high resolution forecasts, wherein at least some of the candidate high resolution forecasts follow different trajectories; and
    for each of the low priority actors, not using any path-influencing characteristics of the scene in which the low priority actor is traveling to determine the low resolution forecast for that low priority actor.

4. The method of claim 1, wherein determining the first amount of time comprises determining a time amount required to generate the low priority forecasts for all of the detected actors.

5. The method of claim 1, wherein generating the forecasts for the detected actors comprises generating low resolution forecasts for all of the detected actors before generating any high resolution forecast for any of the high priority actors.

6. The method of claim 5 further comprising:
by the forecasting system before the motion planning system uses the predicted actions to determine the trajectory for the autonomous vehicle, determining whether the forecasting system actually generated high resolution forecasts for all high priority actors; and
notifying the motion planning system when the forecasting system does not generate high resolution forecasts for all of the high priority actors.

7. The method of claim 1, wherein using at least some of the high resolution candidate forecasts to determine the trajectory for the autonomous vehicle comprises:
determining which of the high resolution candidate forecasts are relevant to a motion planning operation of the autonomous vehicle, and
when determining the trajectory for the autonomous vehicle, using the high resolution candidate forecasts that are relevant to the motion planning operation and not using any of the high resolution candidate forecasts that are not relevant to the motion planning operation.

8. The method of claim 1 wherein, for each detected actor, assigning the priority rating to the detected actor as a high priority actor or a low priority actor comprises:
estimating a velocity of the detected actor;
using the estimated velocity of the detected actor and a velocity of the autonomous vehicle to measure whether the detected actor can reach the autonomous vehicle within a time horizon; and
if the detected actor cannot reach the autonomous vehicle within the time horizon, determining that the detected actor is a low priority actor, otherwise determining that the detected actor may be a high priority actor.

9. The method of claim 1 wherein, for each detected actor, assigning the priority rating to the detected actor as a high priority actor or a low priority actor comprises:
determining a region of interest that surrounds the autonomous vehicle;
assessing whether the detected actor is within the region of interest; and
if the detected actor is not within the region of interest, determining that the detected actor is a low priority actor, otherwise determining that the detected actor may be a high priority actor.

10. The method of claim 1 wherein, for each detected actor, assigning the priority rating to the detected actor as a high priority actor or a low priority actor comprises:
identifying a first path in which the detected actor is traveling and a second path in which the autonomous vehicle is traveling;
assessing whether the first path may conflict with the second path within a region of interest; and
if the first path may conflict with the second path within the region of interest, determining that the detected actor is a low priority actor, otherwise determining that the detected actor may be a high priority actor.

11. The method of claim 10, wherein:
the second path is a street along which the autonomous vehicle is traveling; and
assessing whether the first path may conflict with the second path within the region of interest comprises assessing that the first path may conflict with the second path if any of the following characteristics are present:
the first path is a lane segment that intersects the street within the region of interest,
the first path is a crosswalk that intersects the street within the region of interest, or
the first path is a lane segment of the street and has a nominal direction that matches a direction of travel of the autonomous vehicle.

12. The method of claim 10, wherein:
the second path is a street along which the autonomous vehicle is traveling; and
assessing whether the first path may conflict with the second path within the region of interest comprises assessing that the first path will not conflict with the second path if the first path is a lane segment that is separated from the street by a physical barrier.

13. The method of claim 10, wherein:
the second path is a street along which the autonomous vehicle is traveling; and
assessing whether the first path may conflict with the second path within the region of interest comprises assessing that the first path will not conflict with the second path if:
the first path and the second path are the same street, and
the other actor is behind the autonomous vehicle and moving in a same direction but at a lower speed than the autonomous vehicle.

14. The method of claim 1, wherein the time budget varies based on an environment surrounding the autonomous vehicle that corresponds to a city environment or a rural environment and the trajectory of the autonomous vehicle that corresponds to an intersection or an open road.

15. A vehicle comprising:
a perception system comprising at least one first processor and a first memory including programming instructions that, when executed, are configured to cause the at least one first processor to:
detect a plurality of actors that that are proximate to the vehicle based on information received from at least one of a sensor positioned on the vehicle and a communication device, and
for each of the detected actors, assign a priority rating to the detected actor as a high priority actor or a low priority actor;
a forecasting system comprising at least one second processor and a second memory including programming instructions that, when executed, are configured to cause the forecasting system to:
for each cycle of a plurality of cycles, generate a forecast for each of the detected actors by:
for at least some of the high priority actors, generating a high resolution forecast;
for each of the low priority actors, generating a low resolution forecast; and
saving each of the forecasts in a data store in association with the actor for whom the forecasts were generated,
use at least some of the high resolution forecasts to predict one or more actions for at least some of the high priority actors, and
use at least some of the low resolution forecasts to predict one or more actions for each of the low priority actors;
a motion planning system comprising at least one third processor and a third memory and programming instructions that, when executed, are configured to cause the motion planning system to use the predicted actions to determine a trajectory for the vehicle; and a control system comprising at least one fourth processor and programming instructions that, when executed, are configured to move the vehicle based on the determined trajectory;

wherein the perception system further comprises additional instructions to, before assigning priority ratings to the detected actors:

identify a time budget representing a total amount of time available to generate forecasts for all of the detected actors;

determine a first amount of time that is a time amount required to generate low priority forecasts;

determine a second amount of time that is a time amount available to generate high priority forecasts by subtracting the first amount of time from the total amount of time available;

determine a number of the high priority forecasts that can be generated during the second amount of time; and when assigning the priority ratings to the detected actors, assign high priority ratings to the number of the detected actors and assigning low priority ratings to any remainder of the detected actors;

wherein identifying the time budget representing a total amount of time available to generate forecasts for all of the detected actors comprises identifying the time budget that is available for the high resolution forecasts, and wherein the time budget varies based on at least one of type of a speed of the vehicle and a trajectory of the vehicle.

16. The vehicle of claim 15, wherein the instructions to generate the forecasts for the detected actors comprise instructions to generate low resolution forecasts for all of the detected actors before generating any high resolution forecast for any of the high priority actors.

17. The vehicle of claim 16 further comprising additional programming instructions that are configured to cause the forecasting system to:

before the motion planning system uses the predicted actions to determine the trajectory for the vehicle, determine whether the forecasting system actually generated high resolution forecasts for all high priority actors; and notify the motion planning system when the forecasting system does not generate high resolution forecasts for all of the high priority actors.

18. The vehicle of claim 15, wherein the time budget varies based on an environment surrounding the vehicle that corresponds to a city environment or a rural environment and the trajectory of the vehicle that corresponds to an intersection or an open road.

19. A computer program product comprising a memory device that includes:

programming instructions that, when executed, are configured to cause a perception system of an autonomous vehicle to:

detect a plurality of actors that that are proximate to the autonomous vehicle based on information received from at least one of a sensor positioned on the vehicle and a communication device, and for each of the detected actors, assign a priority rating to the detected actor as a high priority actor or a low priority actor;

programming instructions that, when executed, are configured to cause a forecasting system the autonomous vehicle to:

for each cycle of a plurality of cycles, generate a forecast for each of the actors by:

for at least some of the high priority actors, generating a high resolution forecast;

for each of the low priority actors, generating a low resolution forecast; and saving each of the forecasts in a data store in association with the actor for whom the forecasts were generated, use at least some of the high resolution forecasts to predict one or more actions for at least some of the high priority actors, and use at least some of the low resolution forecasts to predict one or more actions for each of the low priority actors;

programming instructions that are configured to cause a motion planning system of the vehicle to use the predicted actions to determine a trajectory for the autonomous vehicle;

programming instructions that, when executed, are configured to cause a control system of the vehicle move the vehicle based on the determined trajectory, wherein before assigning priority ratings to the detected actors, the computer program product comprises instructions, when executed, are configured to:

identify a time budget representing a total amount of time available to generate forecasts for all of the detected actors;

determine a first amount of time that is a time amount required to generate the low priority forecasts;

determine a second amount of time that is a time amount available to generate the high priority forecasts by subtracting the first amount of time from the total amount of time available;

determine a number of high priority forecasts that can be generated during the second amount of time;

when assigning the priority ratings to the detected actors, programming instructions that, when executed, are configured assign high priority ratings to the number of the detected actors and assigning low priority ratings to any remainder of the detected actors, wherein identifying the time budget representing a total amount of time available to generate forecasts for all of the detected actors comprises identifying the time budget that is available for the high resolution forecasts, and wherein the time budget varies based on at least one of type of a speed of the autonomous vehicle and a trajectory of the autonomous vehicle.

20. The computer program product of claim 19, wherein the time budget varies based on an environment surrounding the autonomous vehicle that corresponds to one of a city environment or a rural environment and the trajectory of the autonomous vehicle that corresponds to an intersection or an open road.

* * * * *